Aug. 4, 1959  D. H. SPITZLI ET AL  2,897,625
NOVEL FLOAT
Filed Oct. 11, 1955

United States Patent Office 2,897,625
Patented Aug. 4, 1959

2,897,625
NOVEL FLOAT

Donald H. Spitzli, Summit, N.J., and Nicholas R. Dolida, Flushing, N.Y., assignors, by mesne assignments, to Akron Products, Inc., Paterson, N.J., a corporation of New Jersey Application October 11, 1955, Serial No. 539,904

4 Claims. (Cl. 43—43.1)

This invention relates to an improved float or buoy produced from expanded, closed-cell, plastic material for supporting fishnets.

In recent years blown or expanded, closed-cell, plastic material or plastic foam, containing many minute closed cells of an inert gas, have been the subject of widespread use for floats or buoys for supporting fishnets. These blown plastic floats have to a considerable extent replaced the corks which have been used for many years. These plastic floats have had fairly extensive use in a number of types of fishing with a high degree of success. These are more buoyant than cork and more resistant to abrasion than cork because of their high degree of elasticity. They may be compressed when squeezed between two boats and yet return to their original shape without incurring damage. They are also resistant to the rotting action of bacteria and fungus, while cork is not. Thus the blown plastic floats have several important advantages over corks.

While the blown plastic fishnet floats have been highly successful in many kinds of fishing, it has been found that in certain large scale fishing operations, such as menhaden fishing where large purse seines are used, these floats have been subject to a peculiar type of damage which reduces the normal service life expectancy of such a float to a period less than is desired. The type of damage to which these floats are subject is by no means unique to plastic floats since corks are subject to the same type of damage. However, in view of the improvements provided by blown plastic net floats over the older corks, it has been a disappointment to the industry that plastic floats are not significantly superior in their resistance to this form of damage also.

Purse seine floats are generally cylindrical in shape and have a hole or channel running through the center of the float parallel with the vertical axis. The floats are strung by these holes along a heavy cord or rope from which the net itself is suspended. The floats are secured in a lateral position along the supporting cord or rope only by the loops of twine which are used for lashing the net to the rope. Hence the float may move along the supporting cord or rope within the limit provided by the lashing twine which holds the net in place. These floats are subject to damage at the center hole with cracks developing which run radially from the center hole toward the periphery of the float. These cracks do not often extend completely to the outside to the extent that the float will fall off the line, but due to the damaged condition there is a danger that the cracks might continue to develop if the floats are left in service long enough and the float might eventually slip from the supporting cord. The order of damage to such floats is such that it has been estimated that as many as 70% of the floats on a net might have to be replaced in the course of a year. This is a condition which is similar to the experience of the fishing industry with corks. Frequent replacement of the net floats is not only a matter of financial loss in the cost of replacing the floats, but considerable labor is required in replacing the floats since the net must be removed from the supporting rope and re-tied after the floats have been replaced.

An investigation has been made as to the cause of this damage to purse seine floats. In the course of this investigation it became evident from an inspection of the method of fishing that the damage was caused by the supporting rope being drawn sharply and with great force in a direction almost normal to the hole of the floats. This occurs in several ways. When the net is being put out over the back of the power boat and the fisherman wishes to arrest the forward movement of the boat, it is a common practice to bring the supporting rope of the net down on the gunwale of the boat. When this is done the first float to come across the gunwale catches and it is braced there by the fisherman. At this time the full forward momentum of the boat is stopped by the dragging action of that part of the net already in the water through the supporting rope with a force which presses the rope into sides of the hole in the float. It is quite evident that it is not a sawing or abrasive action which then damages the float, but a pressure of such high order that tremendous loads are applied in a shearing fashion which causes rupture of the float material. This rupture takes the form of the radial fractures which have been described above.

Another manner in which the float is damaged is perhaps less severe in its extent but, nevertheless, it also causes considerable damage. This damage results where the fisherman in hauling the net into a small boat brings the supporting rope of the net down on the gunwale where it becomes subject to the rocking movement of the boat caused by waves. In high seas the gunwale will rise and fall causing the net to restrain the motion of the boat and the float to wedge against the gunwale. The supporting rope, trying to pull through the hole in the float, tilts the float into such a position that the rope is pulled sharply down into the plastic material thereby causing radial fractures.

It is an object of the invention to provide an improved expanded, closed-cell, plastic float for fishnets which is not subject to damage in the nature of radial fissures.

Another object of the invention is to provide an improved expanded, closed-cell, plastic float for fishnets which is more durable than similar previous floats and, therefore, subject to longer service life.

Other objects and advantages of the invention will be apparent to those skilled in the art from the description which follows.

With these and other objects, features and advantages of the invention in view, certain embodiments of the improved float will be described in greater detail by reference to the accompanying drawings, of which:

Figure 1:
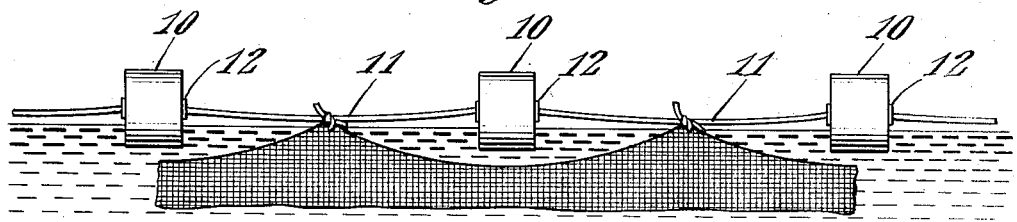
Fig. 1 is a view illustrating how the fishnet floats of the invention are often strung to the supporting rope of a purse seine.

The improved float of the invention will be described in connection with the appended drawings. The improved float comprises a blown or expanded, buoyant plastic member having closed cells filled with an inert gas and having a channel or hole traversing the plastic member and a sleeve member or bushing which is snugly engaged within the channel of the plastic member. In the embodiment illustrated in the drawings the float 10 may be of cylindrical configuration, made of blown plasticized polyvinyl chloride and having a hollow sleeve or bushing 12 seated snugly in the channel or hole 12a which is axially concentric with the cylindrical float and which extends slightly at each end of the channel. The hollow tube is desirably seated or fixed to the inner walls of the channel by means of a waterproof adhesive shown at 13. A suitable waterproof adhesive is a mixture of chlorinated paraffin and chlorinated rubber. To provide a minimum of chafing of the support rope 11 of a fishnet, the hollow tube 12 or sleeve, which is suitably made of drawn aluminum with walls about 0.035 inch thick, is flared or peened over the end of the channel as illustrated. The flaring may be accomplished by means of an arbor press anvil thus bending the ends of the sleeve to produce an angle of about 90° with the sleeve. The flaring or flanging of the ends of the sleeve member also assists in anchoring the sleeve to the plastic member of the float and thus assists the glue in preventing slippage of the sleeve. While excellent results are obtained by gluing the sleeve to the inner walls of the channel or hole, such treatment is not necessary and is entirely optional.

The blown plastic member which comprises a component of the improved float of this invention is a well-known article of commerce and per se does not constitute a part of this invention. These plastic members have been used as net floats. The external configuration of the plastic member may take several forms, such as a cube or cylinder, etc., although the cylindrical form is preferred. The plastic member may be formed in several ways, and from several materials, all of which have been employed commercially. Among the materials which have been employed are rubber, polystyrene and the vinyl resins, such as polyvinyl chloride and polyvinyl chloride acetate, to name a few. The plastic member may be shaped and blown or expanded simultaneously by introducing under pressure an inert gas, such as nitrogen, carbondioxide or helium into a mold containing the molten plastic material. When cooled the expanded plastic member assumes the external configuration of the mold and contains minute, closed, non-communicating cells filled with inert gas. As an alternative to introducing gases under pressure to produce closed-cell formation, a chemical blowing agent, such as diazoaminobenzene, may be introduced into a mold in admixture with the plastic material. When the mold is heated, the chemical blowing agent decomposes, producing minute bubbles of inert gases which produce an expansion of the molten plastic material. Procedures for producing blown plastic articles are described in U.S. Patents Nos. 2,448,154 and 2,491,709. In the case of some materials, the blowing of the plastic material may be accomplished by injecting steam under pressure.

In addition to molding the plastic member into the desired configuration as part of the blowing operation, the plastic material may first be blown in the form of a long sheet from which the plastic member may be cut or carved to provide any desired size or configuration. All of these methods and materials are well known to those skilled in the art and have been commercially available for some time.

The channel or hole which traverses the blown plastic member of the float may be of various configurations. It may be square in cross-section, or it may be circular. It is preferred that the cross-section be circular. The axis of the channel may run concentrically with that of the float or not, as desired. In any event, the hollow sleeve or bushing should conform generally with the cross-section of the channel and fit snugly to it. The sleeve is placed in the channel by sliding it through the channel until it is completely inserted. In order to insure that there will be no slippage of the sleeve in the hole of the float during usage, a waterproof adhesive, which is adhesive both with respect to the plastic and to the material of the sleeve, may be applied to the outer surface of the sleeve and the walls of the hole or channel prior to inserting the sleeve into the hole of the float. It has been observed that such gluing of the sleeve to the walls of the hole improves the durability of the float.

After the sleeve is seated in the hole of the plastic member it is preferred to flare or peen the ends of the sleeve over the edges of the hole of the float, as shown in the drawings. This flaring prevents chafing of the rope by any rough edges at the end of the sleeve.

In selecting a material for producing the sleeve member, it is preferred that metals be employed. However, other materials may be satisfactory. It is desirable to select a material which does not corrode or warp in the presence of salt water, and which has a high shearing strength and malleability. Desirably the material should be light in weight so as not to reduce unduly the buoyancy of the finished float. Additionally, the material should be rigid enough to permit an even distribution of the load over a greater area of the sleeve member and thus prevent fracture of the plastic member. Excellent results have been obtained with metals having a Poisson's ratio of between about 0.30 and 0.36. Poisson's ratio is the ratio of the lateral deformation per unit of dimension of a bar of uniform cross-section compared to its longitudinal deformation per unit of length, when the material is subjected to a tensile stress. Poisson's ratio is defined in Mark's Engineers Handbook, page 414, 5th edition (1951), published by McGraw-Hill. Among the materials which will produce excellent results are those given below with their Poisson's ratio:

| Metal: | Poisson's ratio |
| --- | --- |
| Drawn aluminum | 0.330 to 0.334 |
| Copper | 0.333 to 0.355 |
| Brass | 0.333 |
| Soft stainless steel | 0.303 |
| Monel metal | 0.315 |

It is contemplated, of course, that other materials will also provide satisfactory results. Drawn aluminum and copper have provided best results since they are resistant to corrosion by salt water and have excellent strength. Copper is preferred where greater malleability is desired, and aluminum is more satisfactory where lightness is desired. Magnesium is extremely light and is desirable from that standpoint, but because of its lack of malleability it is not one of the preferred materials.

The advantages of the improved float of the invention, and particularly the improved durability over the comparable floats of the prior art, are demonstrated by comparative tests which have been conducted. While the test conditions are not precisely those to which the float is subjected under service conditions, it provides a more quantitative comparison of the resistance to shearing of the improved floats of the invention with those of the prior art. In accordance with this test, a rope was given two bites around the circumference of the float and tied to one of the jaws of a strength testing machine. Another rope was led through the hole or channel in the float and then tied to the other jaw of the strength testing machine. When a load was applied from the testing machine one rope tended to pull against the side of the channel in a similar fashion to that where a supporting rope of a fishnet pulls into the float when the float is caught against the gunwale of the boat.

Figure 2:
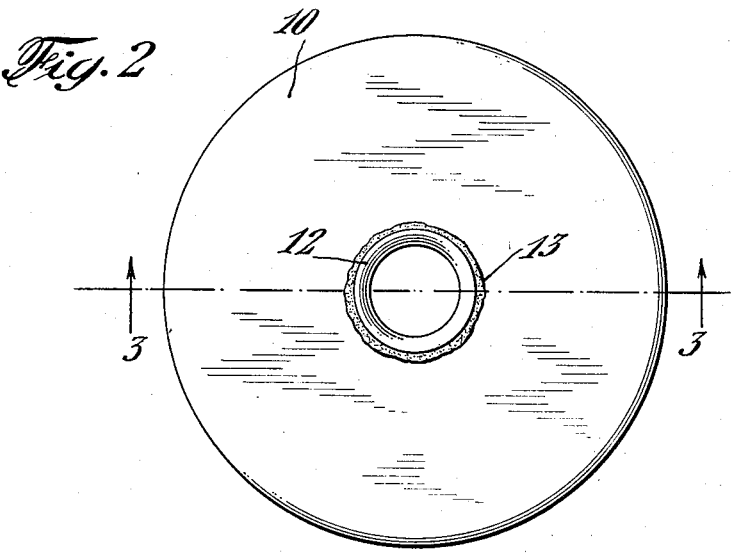
Fig. 2 is a top view of one embodiment of the float of the invention.
Figure 3:
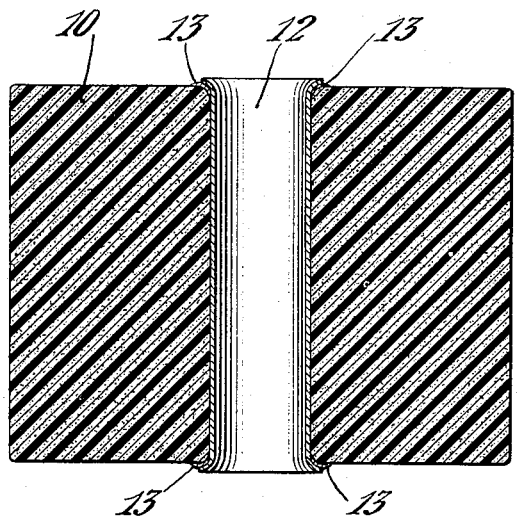
Fig. 3 is a section taken along the line 3—3 of Fig. 2 above.

When an expanded, closed-cell, soft plastic float according to the prior art having an external configuration similar to that shown in Fig. 2 and Fig. 3 of the appended drawings, but without the sleeve member of the present invention, was subjected to the above test, it ruptured at a value of about 125 pounds. When a float of similar construction was produced from vastly harder plastic material, and was therefore substantially less satisfactory as a fishnet float, it was possible to obtain test values as high as only 225 pounds before shearing occurred. However, even this harder float would require replacement each year of about 50% of the floats used on a net as compared to a 70% replacement with those softer floats which sheared at 125 pounds. It is apparent that modifying the composition from which the expanded, closed-cell, plastic member is produced does not provide a satisfactory solution to the shearing problem.

When a thin hollow sleeve of copper tubing according to this invention was snugly seated inside the channel of the soft, expanded, closed-cell, plastic float which provided a shearing test of 125 pounds, about 600 to 700 pounds was required to produce shearing. Replacing the copper tubing with soft aluminum tubing, the shearing strength increased to a value of 400 pounds. In the case of aluminum, the damage occurs either in shearing or when the aluminum tube itself ruptures. Best results were obtained where the hollow metal sleeve was cemented to the walls of the channel of the expanded plastic member. When the copper tube which produced a shear strength test of 600 to 700 pounds was cemented with a waterproof adhesive composed of a mixture of chlorinated paraffin and chlorinated rubber, a shear strength test of well over 1,000 pounds was obtained. Thus it is evident that an unforseeable increase in shear strength may be obtained by snugly seating and securing a rigid sleeve in the channel of the plastic member in a manner that it will not slip.

Additional tests were conducted employing a snugly fitting hollow metal sleeve of slightly larger diameter than the inside of the channel (to thereby provide a highly snug fit), which sleeve was also flanged at the ends of the channel of the float, but without employing an adhesive. For example, when tubing with a wall thickness of about 0.035" was employed in this manner, there were obtained consistent strength tests of at least 400 pounds. This value is over three times that obtained employing the same unreinforced, expanded, soft plastic member which gave a test strength of 125. When copper tubing of a diameter slightly larger than the hole in the float and having a wall thickness of 0.04" was inserted into the channel of the same plastic member and flared at the ends, a shear strength test of at least 600 pounds was obtained. When the same aluminum tubing which provided a shear strength test of at least 400 pounds was also glued to the walls of the channel of the plastic member by means of the waterproof adhesive, the shear strength test value was improved to about 600 pounds; whereas by also gluing the same copper tubing with a waterproof adhesive a test value of over 1,000 pounds was obtained.

It is apparent from the above test data that it is possible by means of the present invention to provide economically an improved float having shear resistance of at least four times and often as high as eight times that of the prior art floats constructed of the same expanded, closed-cell, plastic member. This improvement is achieved without any serious impairment of the buoyancy of the expanded, closed-cell, plastic material. In fact, the improved floats of the present invention possess a buoyancy which is substantially better than that of cork alone.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. An improved fishnet float comprising an expanded, closed-cell, buoyant, plastic member having a channel traversing it and a hollow sleeve member seated within said channel, the ends of said sleeve member being flared over the plastic member at the openings of the channel; said sleeve member being constructed of a metal selected from the class consisting of aluminum and copper and said sleeve member being sufficiently light so as to not impair the buoyancy of said float.

2. An improved fishnet float comprising an expanded, closed-cell, buoyant, plastic member having a channel traversing it, a hollow sleeve member having adhesive means disposed on the outer surface thereof seated in said channel, said adhesive means being adapted to adhere to the said surface of said hollow sleeve member and to the surface of said plastic member, said sleeve member being of a material having a Poisson's ratio of between about 0.30 and 0.36.

3. An improved fishnet float comprising an expanded, closed-cell, buoyant, plastic member having a channel traversing it and a hollow metal sleeve member snugly engaged within said channel, the ends of said sleeve member being flared over the plastic member at the openings of the channel, the metal from which said sleeve member is constructed having a Poisson's ratio of between about 0.30 and 0.36 and said sleeve member being sufficiently light so as to not impair the buoyancy of said float.

4. An improved fishnet float comprising an expanded, closed-cell, buoyant, plastic member having a channel traversing it and a hollow metal sleeve member snugly seated to the walls of said channel, waterproof adhesive means affording adhesion of said hollow sleeve member to said walls of said channel, the ends of said sleeve member being flared over said plastic member at the openings of the channel, the metal from which said sleeve member is constructed having a Poisson's ratio of between about 0.30 and 0.36 and said sleeve member being sufficiently light so as to not impair the buoyancy of said float.

References Cited in the file of this patent

UNITED STATES PATENTS

| | | |
|---|---|---|
| 800,536 | Baily et al. | Sept. 26, 1905 |
| 1,093,414 | Hill | Apr. 14, 1914 |
| 2,136,713 | Schnabel | Nov. 15, 1938 |
| 2,152,684 | Grange et al. | Apr. 4, 1939 |
| 2,181,254 | Wilson | Nov. 28, 1939 |
| 2,310,702 | Ljubetich et al. | Feb. 9, 1943 |
| 2,491,182 | Jaske | Dec. 13, 1949 |

FOREIGN PATENTS

| | | |
|---|---|---|
| 385,585 | Great Britain | Mar. 23, 1931 |
| 415,487 | Great Britain | Aug. 30, 1934 |
| 528,923 | Great Britain | Nov. 11, 1940 |

UNITED STATES PATENT OFFICE

CERTIFICATE OF CORRECTION

Patent No. 2,897,625   August 4, 1959

Donald H. Spitzli et al.

It is hereby certified that error appears in the above numbered patent requiring correction and that the said Letters Patent should read as corrected below.

In the grant, lines 3 and 13, and in the heading to the printed specification, line 5, name of assignee, for "Akron Products, Inc.", each occurrence, read -- Arkon Products, Inc. --.

Signed and sealed this 5th day of January 1960.

(SEAL)
Attest:

KARL H. AXLINE
Attesting Officer

ROBERT C. WATSON
Commissioner of Patents